(12) United States Patent
Masuyama

(10) Patent No.: US 8,533,540 B2
(45) Date of Patent: Sep. 10, 2013

(54) ERROR IDENTIFICATION AND RECOVERY IN VARIABLE PRINT JOBS

(75) Inventor: Yuka Masuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 13/235,778

(22) Filed: Sep. 19, 2011

(65) Prior Publication Data

US 2012/0092695 A1 Apr. 19, 2012

(30) Foreign Application Priority Data

Oct. 18, 2010 (JP) ................................. 2010-234013

(51) Int. Cl.
*G06F 11/00* (2006.01)
(52) U.S. Cl.
USPC .............................. 714/48; 358/1.1; 358/1.15
(58) Field of Classification Search
USPC ..................... 358/1.15, 1.1; 714/48
See application file for complete search history.

(56) References Cited

U.S. PATENT DOCUMENTS

| | | | | |
|---|---|---|---|---|
| 2006/0268307 A1* | 11/2006 | Lee et al. | ..................... | 358/1.13 |
| 2007/0206210 A1* | 9/2007 | Miyazaki et al. | ............ | 358/1.14 |
| 2008/0106750 A1* | 5/2008 | Kim | ............................. | 358/1.13 |
| 2010/0177330 A1* | 7/2010 | Wu et al. | ........................ | 358/1.9 |
| 2010/0182642 A1 | 7/2010 | Masuyama | | |
| 2010/0265539 A1 | 10/2010 | Masuyama | | |

FOREIGN PATENT DOCUMENTS

| | | |
|---|---|---|
| JP | 2008-269261 A | 11/2008 |
| JP | 2009-075634 A | 4/2009 |

OTHER PUBLICATIONS

U.S. Appl. No. 13/323,462, filed Dec. 12, 2011. Applicant: Yuka Masuyama.

* cited by examiner

*Primary Examiner* — Benny Tieu
*Assistant Examiner* — Eric A Rust
(74) *Attorney, Agent, or Firm* — Fitzpatrick, Cella, Harper & Scinto

(57) ABSTRACT

Print processing of a variable print job in which pages having identical finishing settings are grouped as subsets of a plurality of pages to be printed in each record is executed for respective records, and a print error is detected. It is determined whether the print error is detected in the first page in the record or in the subset in that record. The print processing for the record is suspended when it is determined that the print error is detected in the first page in the record. The print processing for the subset is suspended when it is determined that the print error is detected in the first page in the subset. When it is detected that the print error is recovered, the suspended print processing is restarted.

6 Claims, 16 Drawing Sheets

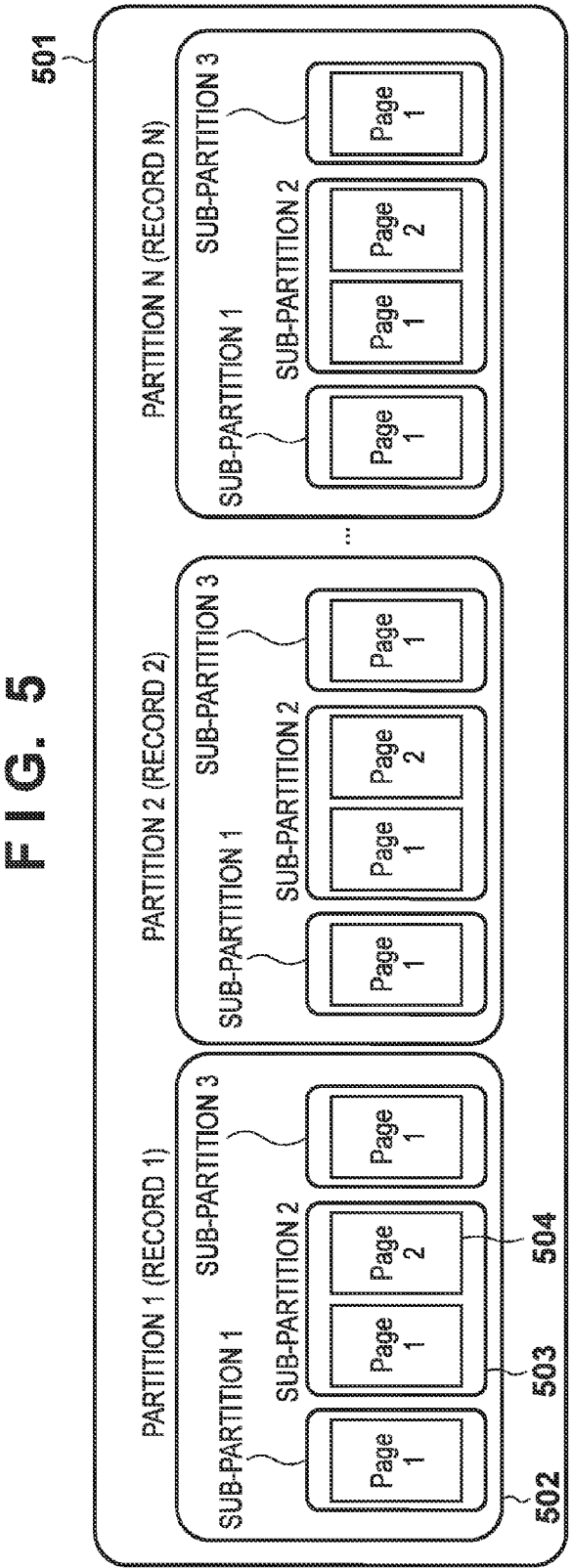

FIG. 7A

```
<?XML version-"1.0". endcoding-"utf-8"?>
<PPML>
<JOB>
<DOCUMENT SET>
<REUSABLE OBJECT>
  REUSABLE OBJECT Title (TITLE)
  REUSABLE OBJECT Course 1 (COURSE 1)
  REUSABLE OBJECT Course 2 (COURSE 2)
  REUSABLE OBJECT Detail (DETAIL)
</REUSABLE OBJECT>

<DOCUMENT>
<PAGE>
  VARIABLE DATA A1
  REUSABLE OBJECT REUSABLE OBJECT  REFER TO TITLE
  REUSABLE OBJECT REUSABLE OBJECT  REFER TO COURSE 1(A1)
  REUSABLE OBJECT REUSABLE OBJECT  REFER TO COURSE 2(A1)
</PAGE>
<PAGE>
  REUSABLE OBJECT  REUSABLE OBJECT  REFER TO DETAILS (A1)
</PAGE>
</DOCUMENT>

<DOCUMENT>
<PAGE>
  VARIABLE DATA A2
  REUSABLE OBJECT REUSABLE OBJECT  REFER TO TITLE
  REUSABLE OBJECT REUSABLE OBJECT  REFER TO COURSE 1(A2)
  REUSABLE OBJECT REUSABLE OBJECT  REFER TO COURSE 2(A2)
</PAGE>
<PAGE>
  REUSABLE OBJECT  REUSABLE OBJECT  REFER TO DETAILS (A2)
</PAGE>
</DOCUMENT>
       ⋮
</DOCUMENT SET>
</JOB>
</PPML>
```

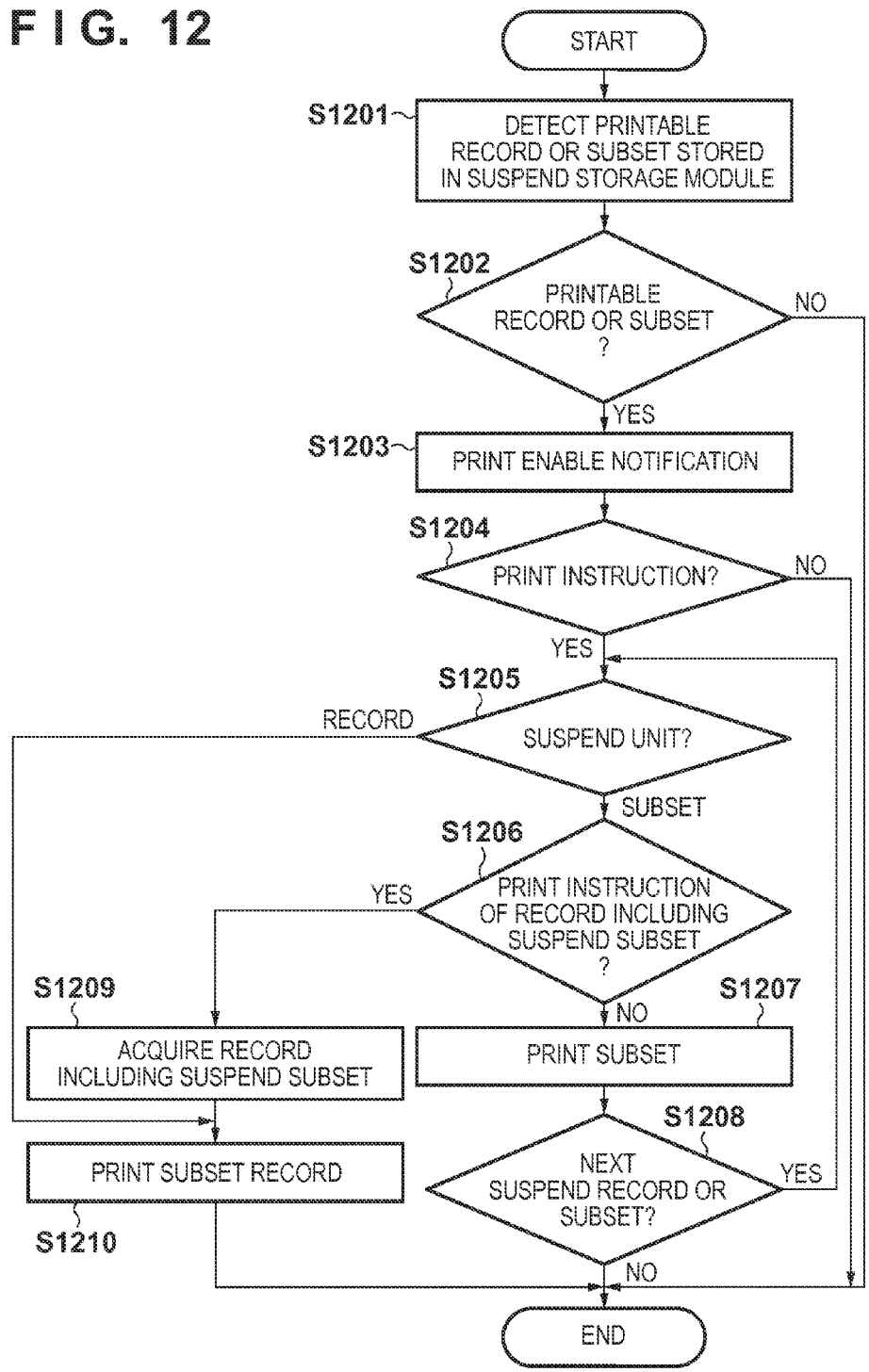

ERROR IDENTIFICATION AND RECOVERY IN VARIABLE PRINT JOBS

BACKGROUND OF THE INVENTION

1. Field of the Invention

The present invention relates to an image forming apparatus, which executes variable print processing, a print job control method, and a storage medium storing a program thereof.

2. Description of the Related Art

The demand for variable print processing that prints data and meets the needs of individual customers has been increasing. A variable print job (VDP job) prints registered customer data for respective records per print job. Therefore, one print job includes tens of thousands of records. In the VDP job, VDP objects are associated with respective records, and are printed while being composited with a master object as a background. The VDP job includes a plurality of records which are basically managed for each job. Japanese Patent Laid-Open No. 2009-75634 describes a method that allows recovery control for each record as a recovery method at the time of occurrence of errors. Japanese Patent Laid-Open No. 2009-75634 describes variable print processing in which when an error has occurred while print data are generated for respective records, print processing is continued while switching the processing order to a later record. Also, Japanese Patent Laid-Open No. 2009-75634 describes that variable print data for re-print processing including a record which has caused the error is automatically generated. Japanese Patent Laid-Open No. 2008-269261 describes that a print job associated with variable print processing is to be managed (deleted, paused, and order-changed) for respective records.

On the other hand, in the market, needs for subset finishing that allows a plurality of different subsets to be set in a single job are high. Note that a subset is a set of pages defined in a single print job. Different subset settings mean a case in which "stapling" is set in a certain subset, but not in another subset. As a principal use of such subset print processing, texts to be distributed are known. Each text to be distributed includes a plurality of subsets bound by a binder, and respective subsets can have different print settings.

By combining the aforementioned subset finishing and VDP print processing, print processing can be done for respective records for each user, and finishing settings can be customized for respective subsets. As a result, highly customized texts and brochures can be created.

When the subset finishing and VDP print processing are combined, one print job includes various types of printing media settings, finishing settings, and discharge destination settings. As a result, print processing may be interrupted by a paper feed error or tray full error, resulting in a drop of the overall productivity. However, the conventional VDP print processing does not consider any combination with the subset finishing. That is, since the conventional VDP print processing allows only control for respective records, some subsets in records are suspended for each record although their print processing can be continued. Hence, for example, when a paper feed error has occurred at a head position of a record, and the same paper type setting is made for all head records, print processing of all the records is consequently interrupted. However, when a job can be suspended for each subset, since some subsets in a record can be continuously printed, the overall print processing need not be interrupted. When a job can be suspended only for each record, since subsets, which have already been printed, have to be re-printed, they are redundantly printed. When a record includes many pages, a re-print time is also prolonged.

Also, processing for reducing an interrupt count of print processing can be done only for each record. Therefore, for a print job of the subset finishing, which allows different settings for respective subsets, the processing for reducing an interrupt count of print processing is not optimal.

SUMMARY OF THE INVENTION

An aspect of the present invention is to eliminate the above-mentioned problems with the conventional technology. The present invention provides an image forming apparatus which allows a variable print job to be controlled for respective records and for respective subsets to improve the print processing efficiency of the entire variable print job, a print job control method, and a storage medium storing a program thereof.

The present invention in its first aspect provides an image forming apparatus, which executes print processing based on a variable print job which changes print contents for respective records, comprising: a print processing unit configured to execute, for respective records, print processing of the variable print job in which pages having identical finishing settings are grouped as subsets of a plurality of pages to be printed in each record; an error detection unit configured to detect a print error during the print processing by the print processing unit; a determination unit configured to determine whether the print error is detected in a first page in the record or in the subset in that record; a first suspend unit configured to suspend print processing for the record when the determination unit determines that the print error is detected in the first page in the record; a second suspend unit configured to suspend print processing for the subset when the determination unit determines that the print error is detected in the first page in the subset; a recovery detection unit configured to detect whether or not the print error is recovered; and a restart unit configured to restart the print processing suspended by the first suspend unit or the second suspend unit when the recovery detection unit detects that the print error is recovered.

The present invention in its second aspect provides a print job control method executed by an image forming apparatus, which executes print processing based on a variable print job which changes print contents for respective records, the method comprising: a print processing step of executing, for respective records, print processing of the variable print job in which pages having identical finishing settings are grouped as subsets of a plurality of pages to be printed in each record; an error detection step of detecting a print error during the print processing in the print processing step; a determination step of determining whether the print error is detected in a first page in the record or in the subset in that record; a first suspend step of suspending print processing for the record when it is determined in the determination step that the print error is detected in the first page in the record; a second suspend step of suspending print processing for the subset when it is determined in the determination step that the print error is detected in the first page in the subset; a recovery detection step of detecting whether or not the print error is recovered; and a restart step of restarting the print processing suspended in the first suspend step or the second suspend step when it is detected in the recovery detection step that the print error is recovered.

The present invention in its third aspect provides a storage medium storing a program for controlling a computer to function as an image forming apparatus, which executes print processing based on a variable print job which changes print contents for respective records, the program controlling the computer to: execute, for respective records, print processing of the variable print job in which pages having identical finishing settings are grouped as subsets of a plurality of pages to be printed in each record; detect a print error during the print processing; determine whether the print error is detected in a first page in the record or in the subset in that record; suspend print processing for the record when it is determined that the print error is detected in the first page in the record; suspend print processing for the subset when it is determined that the print error is detected in the first page in the subset; detect whether or not the print error is recovered; and restart the suspended print processing when it is detected that the print error is recovered.

According to the present invention, a variable print job can be controlled for respective records and for respective subsets, and the processing efficiency of the overall variable print job can be improved.

Further features of the present invention will become apparent from the following description of exemplary embodiments with reference to the attached drawings.

BRIEF DESCRIPTION OF THE DRAWINGS

FIG. 5 is a view showing a hierarchical relationship among a job, subsets, records, and pages;

FIG. 6 is a table showing an example of spreadsheet data;

FIGS. 7A and 7B are views showing an example of a PPML file and an image of its printouts;

FIG. 12 is a flowchart showing the sequence of re-print processing in step S1120;

DESCRIPTION OF THE EMBODIMENTS

Figure 1:
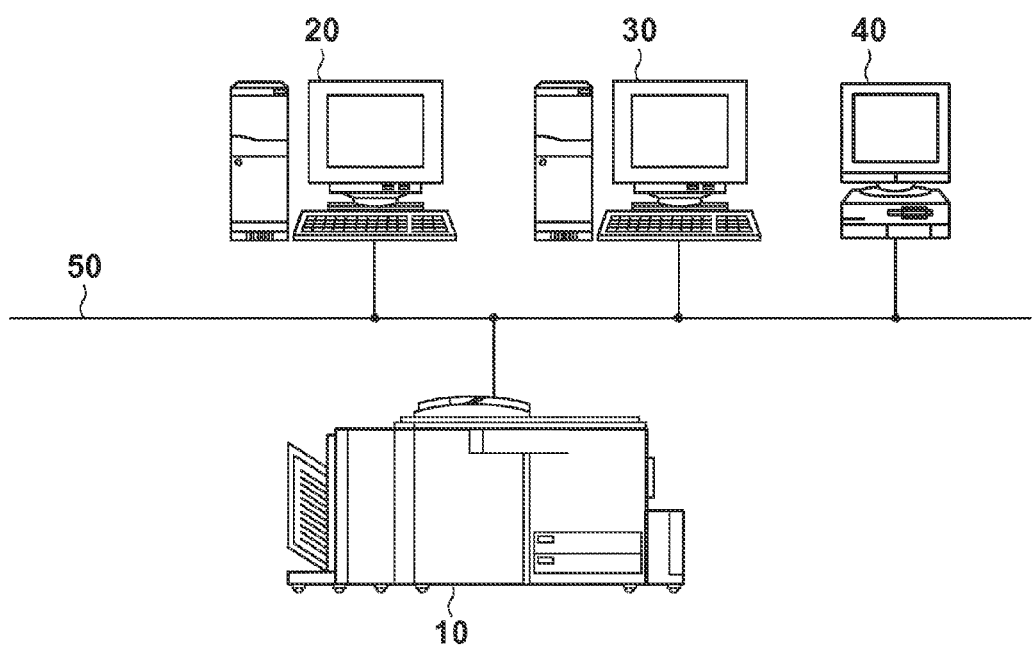
FIG. 1 is a block diagram showing an example of the basic arrangement of an image forming system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will not be repeated.

<Image Forming System>

FIG. 1 is a block diagram showing an example of the basic arrangement of an image forming system according to an embodiment of the present invention. The image forming system according to this embodiment includes an image forming apparatus 10, print server 20, file server 30, and client PC 40. The image forming apparatus 10, print server 20, file server 30, and client PC 40 are connected via a network 50 such as a LAN or WAN to be able to communicate with each other.

The image forming apparatus 10 has various functions such as a scan function, print function, and copy function. The file server 30 saves a database associated with variable data used in variable print processing, for example, a customer database including customer data such as destinations, addresses, and names. The print server 20 manages an input print job and the image forming apparatus 10 connected via the network 50. Also, the print server 20 monitors statuses of the connected image forming apparatus 10 and all print jobs, and controls pause, setting change, and print restart processes of a print job, or copy, move, and delete processes of a job. The client PC 40 has a function of editing an application file, and issuing a print instruction of the file. The client PC 40 has a function of assisting monitoring and control of the image forming apparatus 10 and print jobs managed in the print server 20. An operator can confirm job statuses using the client PC 40.

<Block Arrangement of Image Forming Apparatus>

Figure 2:
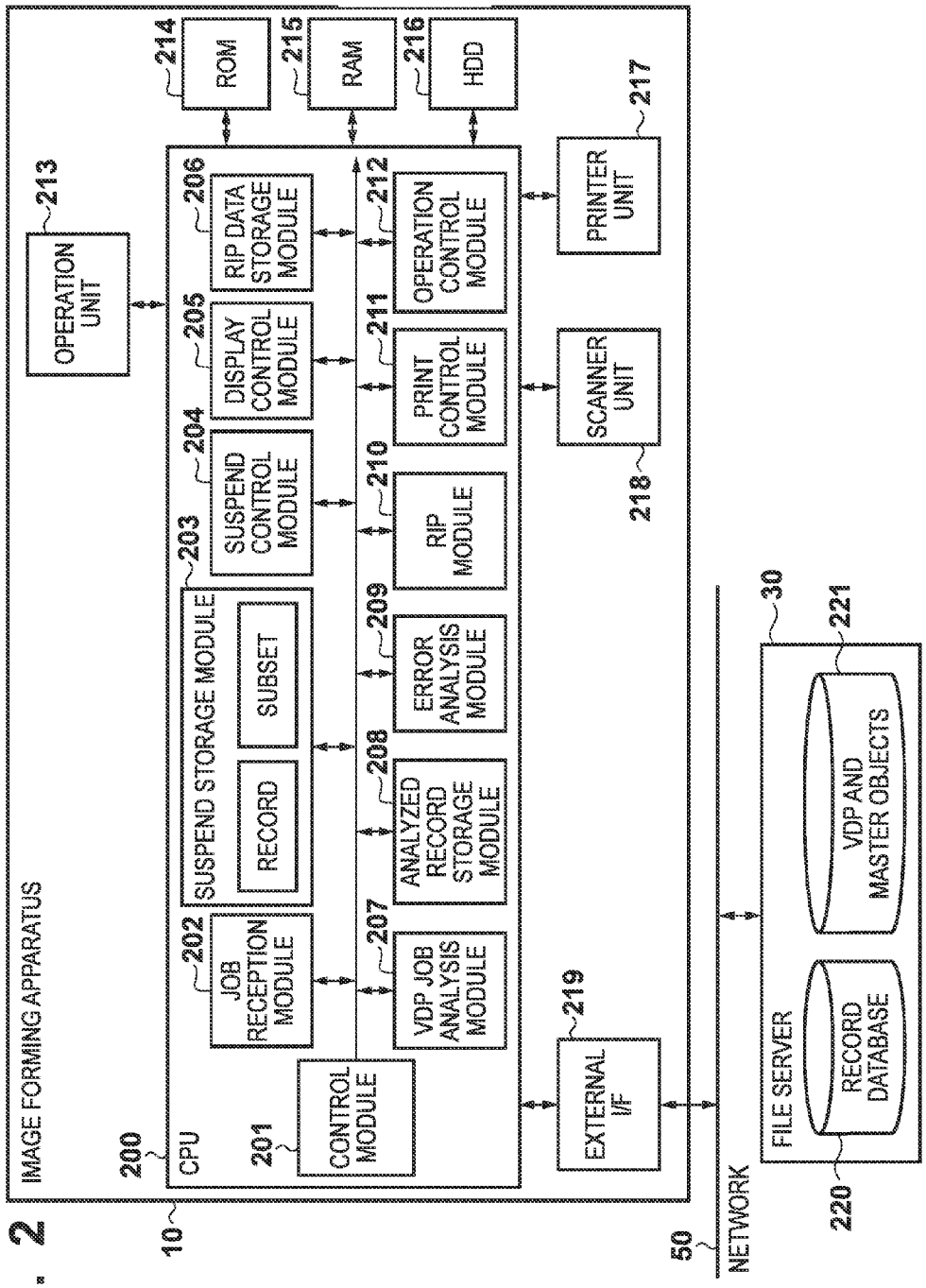
FIG. 2 is a block diagram showing the basic arrangement of an image forming apparatus.

FIG. 2 is a block diagram showing the basic arrangement of the image forming apparatus 10. A CPU 200 systematically controls processes, operations, and the like of various units included in the image forming apparatus 10. An operation unit 213 allows an operator to make various inputs, and includes various keys and the like. A ROM 214 is a read-only memory, and pre-stores various programs such as a boot sequence and font information. A RAM 215 is a random access memory, and stores image data sent via an external I/F 219, various programs, and setting information. An HDD 216 is a large-capacity storage device which stores image data and the like, and can hold a plurality of data such as print data of a print job to be processed. The external I/F 219 is connected to the network 50, and exchanges image data with a facsimile apparatus, network-connected apparatus, and external dedicated apparatus. A scanner unit 218 scans an image of a document on a document feed unit 301 to generate image data. A printer unit 217 prints image data accepted from, for example, the scanner unit 218 and external I/F 219.

A control module 201 and respective function modules 202 to 212 to be described below are function blocks implemented by control programs which are read out from the HDD 216 on the image forming apparatus 10, are stored on the RAM 215, and are executed by the CPU 200 on the image forming apparatus 10. The control module 201 controls the respective function modules 202 to 212 of the image forming apparatus 10, and controls the operations of the overall image forming apparatus 10. An operation control module 212 accepts inputs of various keys on the operation unit 213. The operation control module 212 notifies the control module 201 of the contents of the inputs of the various keys. The control module 201 executes print job control processing such as a re-print operation or job cancel operation for the function modules 202 to 212 according to the contents notified from the operation control module 212. A display control module 205 controls display of various user interfaces and the like, and controls display devices such as an LCD and LEDs on the operation unit 213. A job reception module 202 receives a variable print job (to be referred to as a VDP job hereinafter) input from the client PC 40 via the external I/F 219, and stores the received job in the HDD 216. Upon completion of this processing, the job reception module 202 notifies the control module 201 of completion of the processing. In response to this notification, the control module 201 instructs a VDP job analysis module 207 to execute analysis processing of the VDP job.

The VDP job analysis module 207 sequentially analyzes the VDP job received from the job reception module 202 with reference to a record database 220 stored in the file server 30 according to the instruction of the control module 201. In this case, the VDP job analysis module 207 refers to a master object and VDP (variable data) objects 221, which are referred to by records, and associates them with each other. Then, the VDP job analysis module 207 sends the analyzed record to an analyzed record storage module 208. The analyzed record storage module 208 stores records received from the VDP job analysis module 207 in the HDD 216. Upon completion of this processing, the analyzed record storage module 208 notifies the control module 201 of completion of the processing. In response to this notification, the control module 201 instructs an RIP module 210 to execute RIP processing of analyzed data.

The RIP module 210 receives the analyzed data from the analyzed record storage module 208, and executes RIP (Raster Image Processor) processing according to the instruction of the control module 201. Then, the RIP module 210 sends RIP-processed data to an RIP-processed data storage module 206. The RIP-processed data storage module 206 stores the RIP-processed data received from the RIP module 210 in the HDD 216. Upon completion of this processing, the RIP-processed data storage module 206 notifies the control module 201 of completion of the processing. In response to this notification, the control module 201 instructs a print control module 211 to execute print processing of the RIP-processed data.

The print control module 211 receives the RIP-processed data received from the RIP-processed data storage unit 206, and executes the print processing according to the instruction of the control module 201. The print control module 211 feeds required printing media based on print information, and controls various kinds of hardware shown in FIG. 3 to execute the print processing based on designated finishing settings and designated output methods. Upon completion of the processing, the print control module 211 notifies the control module 201 of completion of the processing. When a print error has occurred during the processing, the print control module 211 notifies the control module 201 of occurrence of the print error (an example of error detection). In response to the notification, the control module 201 instructs an error analysis module 209 to execute error analysis processing. The error analysis module 209 notifies the control module 201 of an error analysis result. Upon reception of the result of the error analysis module 209, the control module 201 instructs a suspend control module 204 to execute suspend data control processing. The suspend control module 204 decides a data range (subset or record unit) that can be suspended (to suspend the print processing). The suspend control module 204 notifies the control module 201 of the suspend unit data. The control module 201 notifies the RIP-processed storage unit of suspend target data received from the suspend control module 204 so as to send target RIP-processed data to a suspend storage module 203. The suspend storage module 203 temporarily stores the target RIP-processed data in a record unit (an example of first suspend) and subset unit (an example of second suspend).

When the print error is recovered, the print control module 211 notifies the control module 201 of recovery of the print error (an example of recovery detection). In response to this notification, the control module 201 sends an error recovery content notification to the suspend control module 204 and instructs that module to detect re-printable data. Based on the error recovery contents received from the control module 201, the suspend control module 204 detects whether or not printable suspend data are stored in the suspend storage module 203. If printable data are stored, the suspend control module 204 notifies the display control module 205 to display the stored data. The display control module 205 notifies the operation unit to display the data received from the suspend control module 204, thus notifying an operator that the printable suspend data are stored. When the operator inputs a print instruction of the suspend data to the operation unit 213, the display control module 205 receives the instruction, and notifies the control module 201 of that instruction. In response to this notification, the control module 201 issues a print instruction to the suspend control module 204. The suspend control module 204 acquires the corresponding data from the suspend storage module, and sends them to the print control module 211.

<Arrangement around Print, Paper Feed, and Discharge Mechanisms of Image Forming Apparatus>

Figure 3:
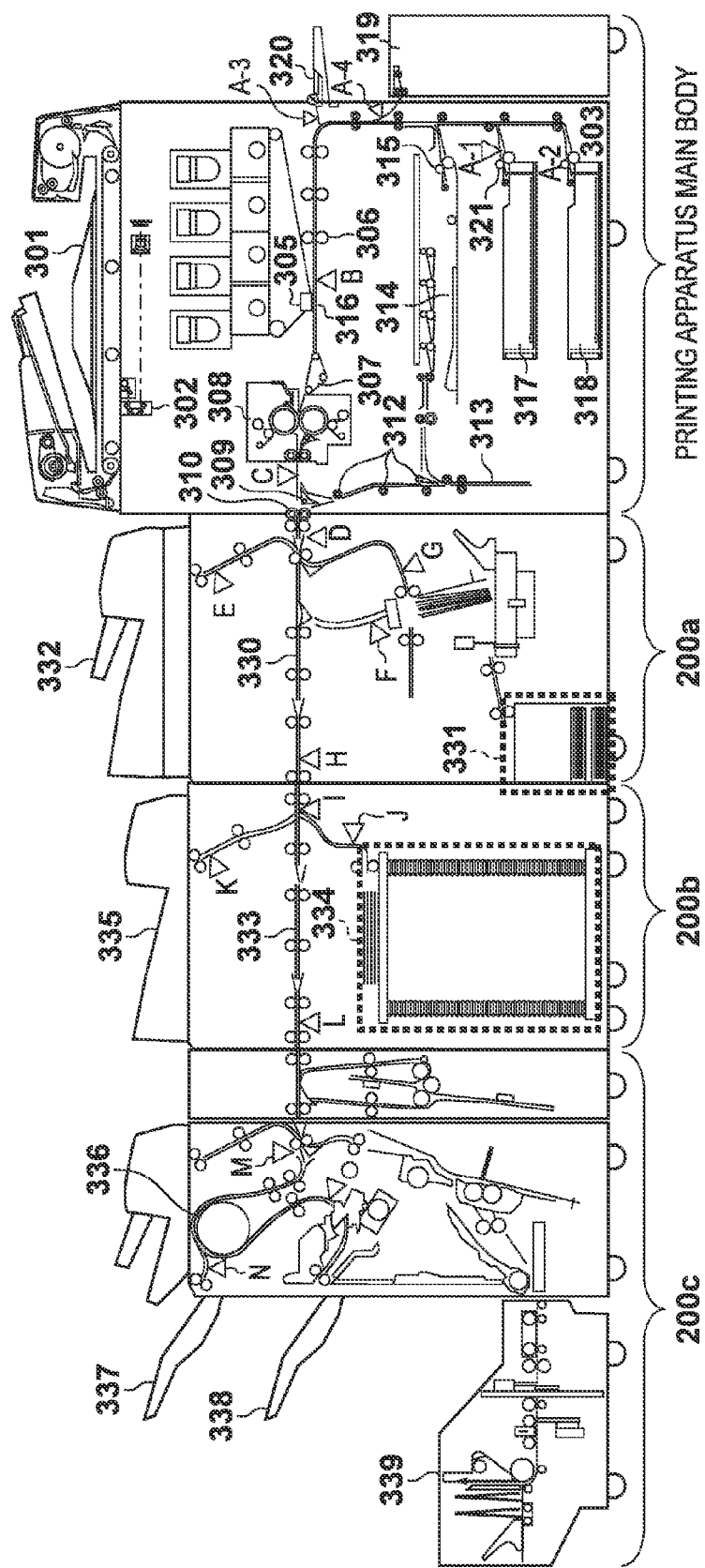
FIG. 3 is a sectional view showing the mechanical arrangement of the image forming apparatus.

The arrangement of the image forming apparatus 10 will be described below with reference to the sectional view shown in FIG. 3. Note that in this case, only a description of paper feed, print, and discharge related mechanisms according to this embodiment will be given. The image forming apparatus 10 has an arrangement of a tandem type color printer which includes a plurality of photosensitive members (drums). The image forming apparatus 10 includes paper feed units such as paper feed cassettes 317 and 318 and a manual insertion tray 320, and feeds sheets from any of these paper feed units. Also, to the image forming apparatus 10, a paper feed deck 319 which can store large quantities of sheets is connected as a paper feed unit, and sheets can be fed from the paper feed deck 319.

Sheets, on one or two faces of which images are printed by the image forming apparatus 10, are selectively conveyed up to a glue binder 200*a*, a large-capacity stacker 200*b*, or a saddle stitcher 200*c* as a sheet processing apparatus according to print settings from the operation unit 213. When it is set to execute glue binding, the sheets are conveyed to the glue binder 200*a* to undergo binding processing, and are then discharged on a bound matter discharge unit 331. That is, the binding processing bundles up a plurality of sheets, on which images are printed by the image forming apparatus 10, using a sheet fed from an inserter 332 as needed. A bound printed matter is accumulated on the bound matter discharge unit 331. When it is set to execute bulk stacking processing, sheets on which images are printed by the image forming apparatus 10 are conveyed to the large-capacity stacker 200*b* via a sheet convey path 330 of the glue binder 200*a*. The large-capacity stacker 200*b* discharges the received sheets onto an escape tray 335 or a stacking unit 334. When no post-processing setting is made, the sheets on which images are printed by the image forming apparatus 10 are conveyed to the saddle stitcher 200*c* via the sheet convey path 330 of the glue binder 200*a* and a sheet convey path 333 of the large-capacity stacker 200*b*. The saddle stitcher 200*c* discharges the received sheets onto a discharge unit 337 via a sheet convey path 336. When it is set to execute staple processing, the saddle stitcher 200*c* accumulates the received sheets on an intermediate tray via the sheet convey path 336. Then, when sheets to be stapled for one bundle are accumulated on the intermediate tray, the saddle stitcher 200c staples the bundle of sheets, and discharges it onto a discharge unit 338. When it is set to execute saddle stitching processing, the saddle stitcher 200c executes the saddle stitching processing for received sheets, and discharges them onto a discharge unit 339.

As described above, the paper feed processing, print processing, post-processing, discharge processing, and the like are executed in the image forming apparatus 10. Sheet detection sensors A-1, A-2, A-4, and A-3 as corresponding paper feed sensors are respectively arranged at paper feed ports of the paper feed units such as the paper feed cassettes 317 and 318, paper feed deck 319, and manual insertion tray 320. Each of these paper feed sensors detects a fed sheet, and sends a sheet detection signal to the control module 201. The control module 201 counts the number of sheets fed from each paper feed unit according to the sheet detection signals received from the paper feed sensor. The control module 201 holds the count value in the RAM 215. Thus, the control module 201 can recognize the numbers of sheets fed from the respective paper feed units upon execution of a job. The discharge unit 337 of the saddle stitcher 200c includes a discharge sensor N. The discharge sensor N detects a sheet discharged onto the discharge unit 337, and sends a sheet discharge signal to the control module 201. The control module 201 counts the number of discharged sheets according to the sheet discharge signals. The control module 201 holds the count value in the RAM 215. Thus, the control module 201 can recognize the number of sheets discharged on the discharge unit 337 upon execution of a job. This embodiment will explain a case in which the image forming apparatus 10 is a 4D (drum) type color MFP (Multi Function Peripheral). However, the arrangement of the image forming apparatus 10 is not limited to this, and the present invention may be applied to a monochrome MFP or 1D (drum) type color MFP.

<VDP Job>

Figure 4:
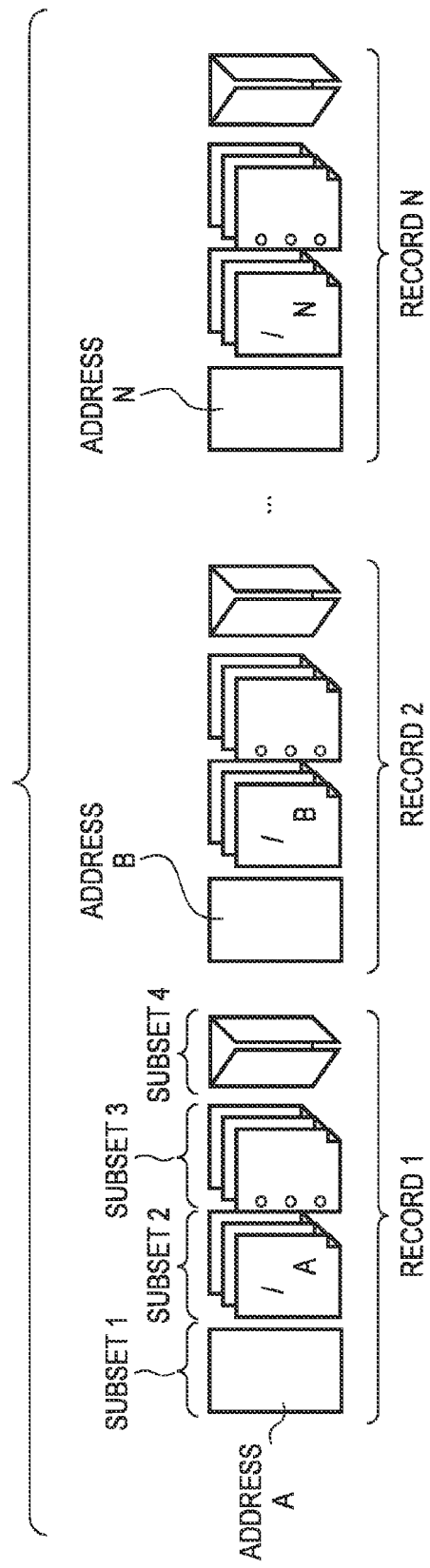
FIG. 4 is a view showing an example of a VDP job including subset finishing settings.

FIG. 4 shows an example of a VDP job which is to be printed in this embodiment and includes subset finishing settings. The VDP job has a plurality of records, and record information is stored in the file server. In this embodiment, the number of customers registered in the record database corresponds to the number of records to be printed. In this embodiment, since subset finishing is designated for each record, each record includes a plurality of subsets. In this case, a subset is a unit to which various finishing settings are applied. For respective subsets, different paper types, discharge destinations, staple settings, punch settings, fold settings, and the like can be made. In the example of FIG. 4, four subsets are set in record 1. For subset 1, no particular finishing setting is made. A staple setting, 3-hole punch setting, and 3-fold setting are respectively designated for subsets 2, 3, and 4. In this way, the subset finishing allows to set independent finishing settings in respective subsets.

For subset 3 of record 2, a paper type different from record 1 is set, and these settings are customized according to variable data. Likewise, for subset 3 of record N, a 2-hole punch setting is designated. When the VDP job includes subset finishing settings, not only print data for respective users can be customized, but also finishing settings can be switched to appropriate settings for respective users, thus outputting highly customized output matters. However, by combining the subset finishing and VDP print processing, since one job includes a larger number of printing media settings, finishing settings, and discharge destination settings, a job during print processing may be frequently interrupted by a paper feed error and tray full error.

FIG. 5 hierarchically shows a job, subsets, records, and pages. As shown in FIG. 5, a VDP (variable data) job 501 has a plurality of records 502. In this case, a unit of a record is defined as a partition. Each partition includes one or more subsets. A unit of this subset is defined as a sub-partition. Different finishing settings can be set in sub-partition units. Each sub-partition 503 includes one or more pages 504. The numbers of pages included in respective sub-partitions need not always be the same, and are different depending on the print contents instructed by the respective records 502. In this embodiment, the VDP job analysis module 207 analyzes the VDP job and assigns IDs to the respective partitions (records) 502 and respective sub-partitions (subsets) 503. Using these partition IDs and sub-partition IDs, the suspend control module 204 can specify partitions or sub-partitions to be managed.

FIG. 6 exemplifies an initial part of spreadsheet data read out from the record database 220 stored in the file server 30. Reference numerals 601 to 607 denote data fields in record data or the database. The data field 601 indicates a customer number, the data field 602 indicates a name, the data field 603 indicates an address, the data field 604 indicates an age, the data field 605 indicates a link destination of a master file, the data field 606 indicates course 1, the data field 607 indicates course 2, and the data field 608 indicates detailed information. Furthermore, link destinations where respective courses and objects of detailed information are stored may also be registered.

Figure 7B:
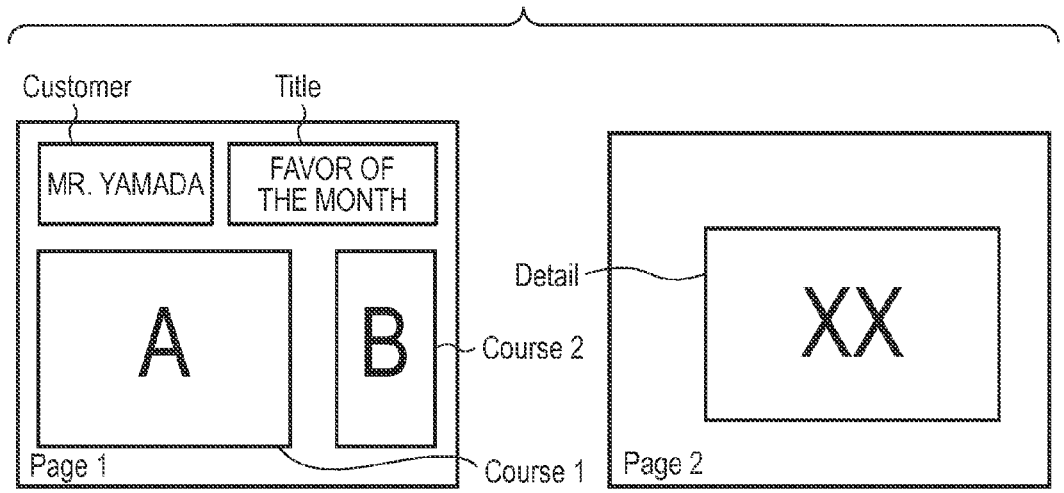

FIG. 7A shows an example of a PPML file to be analyzed by the VDP job analysis module 207. The example of the PPML file shown in FIG. 7A is that required when printed matters in which one record includes two pages, and includes variable data based on the customer data shown in FIG. 6 and reusable data, as shown in FIG. 7B, are to be output. The first page of the record includes a customer's name as variable data An (n indicates a record number). Also, the first page includes reusable data Course1 and Course2, which are registered in the customer's database. The second page also includes reusable data Details registered in the customer's database. In the example of FIG. 7A, at the time of generation of the PPML file, a <Document> tag is appended for each record, and <Page> tags for two pages are appended in the <Document> tag. Note that as a tag used to identify each record, the <Document> tag need not always be used. For example, a comment appended by an application which generates the PPML file may be appended, or no tag used to identify each record need be appended.

<Overall Sequence of Print Processing of VDP Job>

Figure 8:
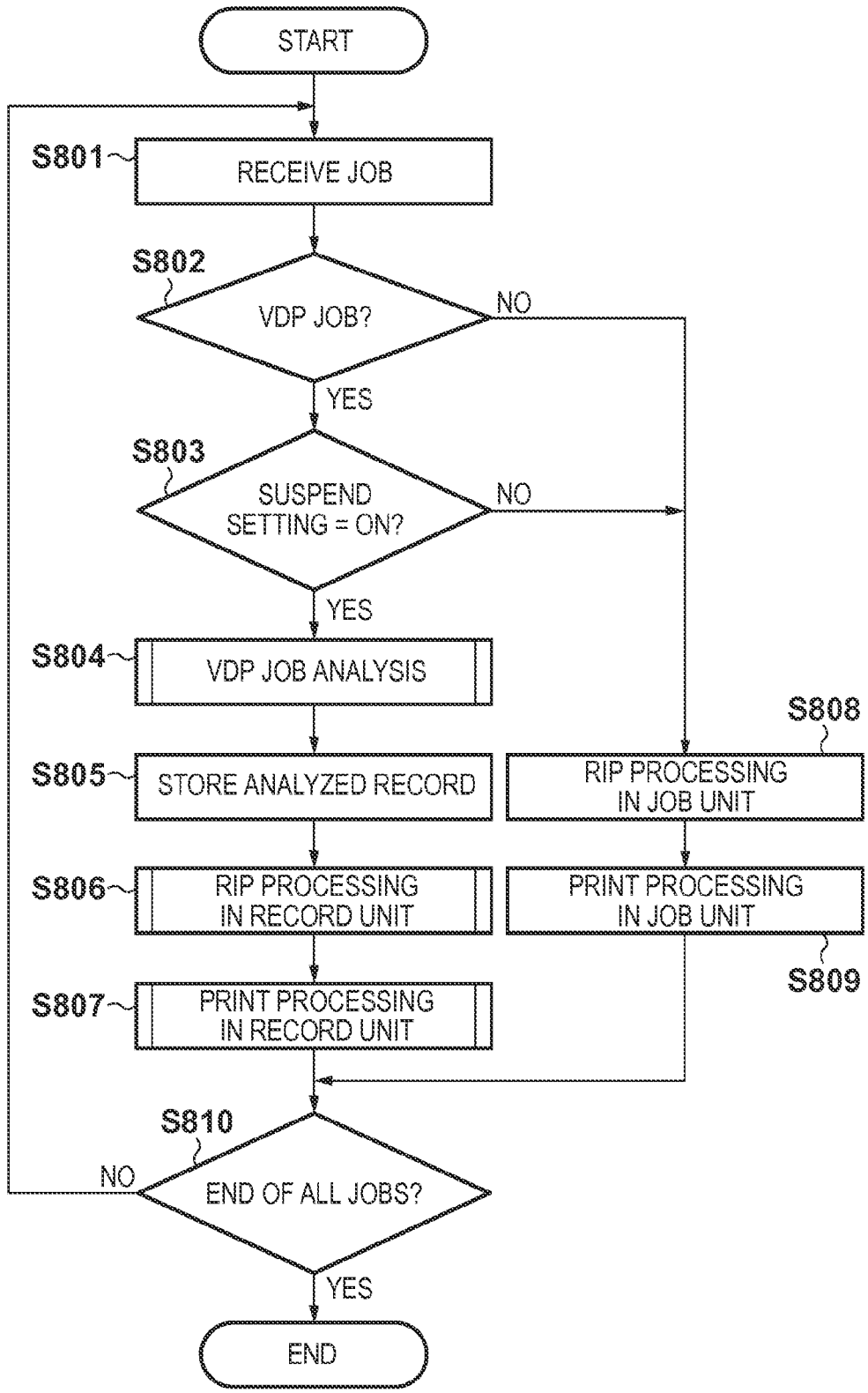
FIG. 8 is a flowchart showing the sequence of processing from when a VDP job is received until it is printed.
Figure 9:
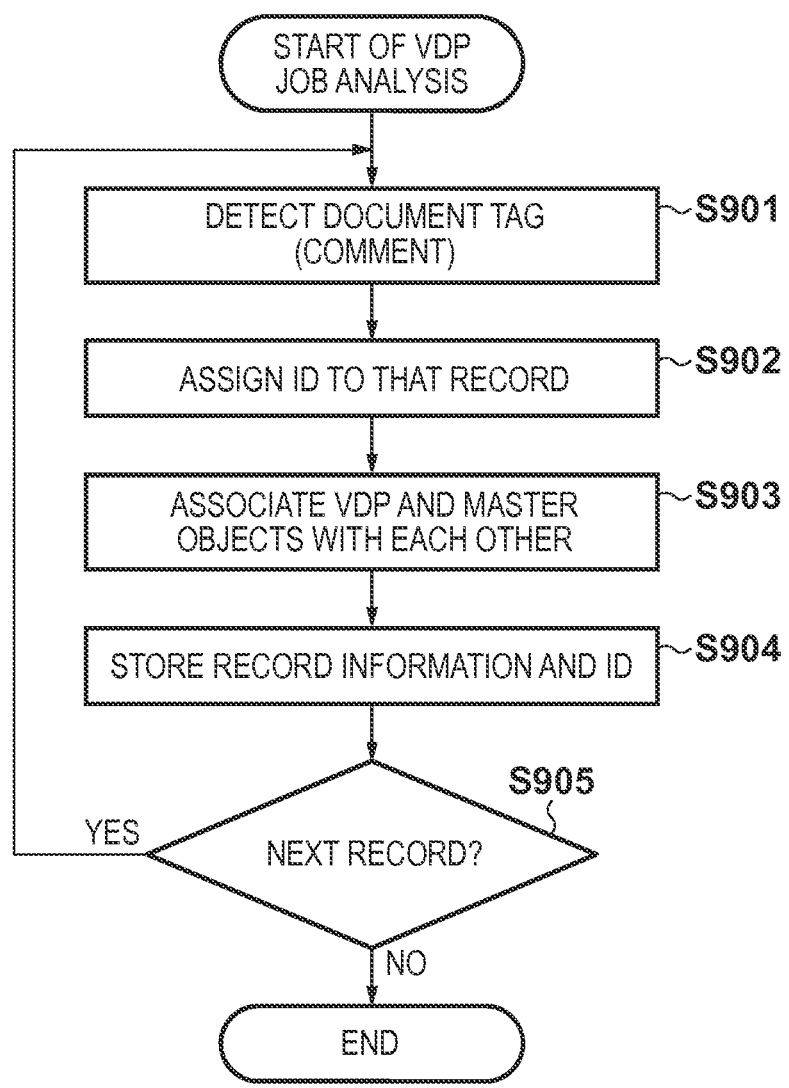
FIG. 9 is a flowchart showing the sequence of processing required to associate VDP and master objects with each other.

FIG. 8 is a flowchart showing the basic sequence from when the image forming system receives a VDP job until it prints the job. Respective processes shown in FIG. 8 and FIGS. 9 and 10 to be described later are executed by, for example, the CPU 200. In step S801, the job reception module 202 receives a job sent from the print server 20. The job reception module 202 determines in step S802 whether or not the received job is a VDP job. As an example of the VDP job, a PPML (Personalized Printer Marked Language) format is known. If it is determined that the received job is a VDP job, the process advances to step S803. On the other hand, if it is determined that the received job is not a VDP job, the process advances to step S808. The job reception module 202 determines in step S803 whether or not a setting of suspend processing to be executed when a print error occurs is ON. If an execution instruction of the suspend processing is ON, the process advances to step S804. On the other hand, if the execution instruction of the suspend processing is OFF, the process advances to step S808. This instruction can be set by the operator in advance for each job or each image forming apparatus. In step S804, the VDP job analysis module 207 analyzes the VDP job. Upon analyzing the VDP job, the VDP job analysis module 207 detects record delimiters from received PPML data. Then, the VDP job analysis module 207 reads the record database 220 stored in the file server 30 to associate VDP (variable data) objects and master objects, which are designated by respective records, with each other. FIG. 9 shows details of this processing. In step S805, the analyzed record storage module 208 appends identification IDs to respective records, and stores record information to be described later and job information to be referred to. Then, the analyzed record storage module 208 sends the analyzed record information to the RIP module 210. In step S806, the RIP module 210 applies RIP processing (Raster Image Process) to the VDP job for respective records. In step S807, the print control module 211 controls to receive the records that have undergone the RIP processing in step S805, and to execute print processing of these records. After execution of the print processing, this processing ends. In step S808, the RIP module 210 applies the RIP processing to a job other than the VDP job or the VDP job for which the suspend processing is designated in a job unit which is not a record unit. In step S809, the printer unit 217 executes print processing of the job, which has undergone the RIP processing in step S808, for each job.

<Assignment of Record ID>

FIG. 9 is a flowchart showing the sequence when the VDP job analysis module 207 analyzes the PPML file appended with comments which indicate delimiters of records, as shown in FIG. 8. In step S901, the VDP job analysis module 207 detects a next record based on an appended <Document> tag. In step S902, the VDP job analysis module 207 assigns a record ID to the record detected in step S901. In step S903, the VDP job analysis module 207 reads VDP and master objects stored in the file server 30 and associates them with each other. In step S904, the analyzed record storage module 208 stores record information associated in step S903 and the ID assigned in step S902. At this time, information of the job is also stored for each record. The VDP job analysis module 207 determines in step S905 whether or not a next record remains. As a result, if the next record remains, the process returns to step S901; if no next record remains, this processing ends.

<Assignment of Subset ID and Page ID>

Figure 10:
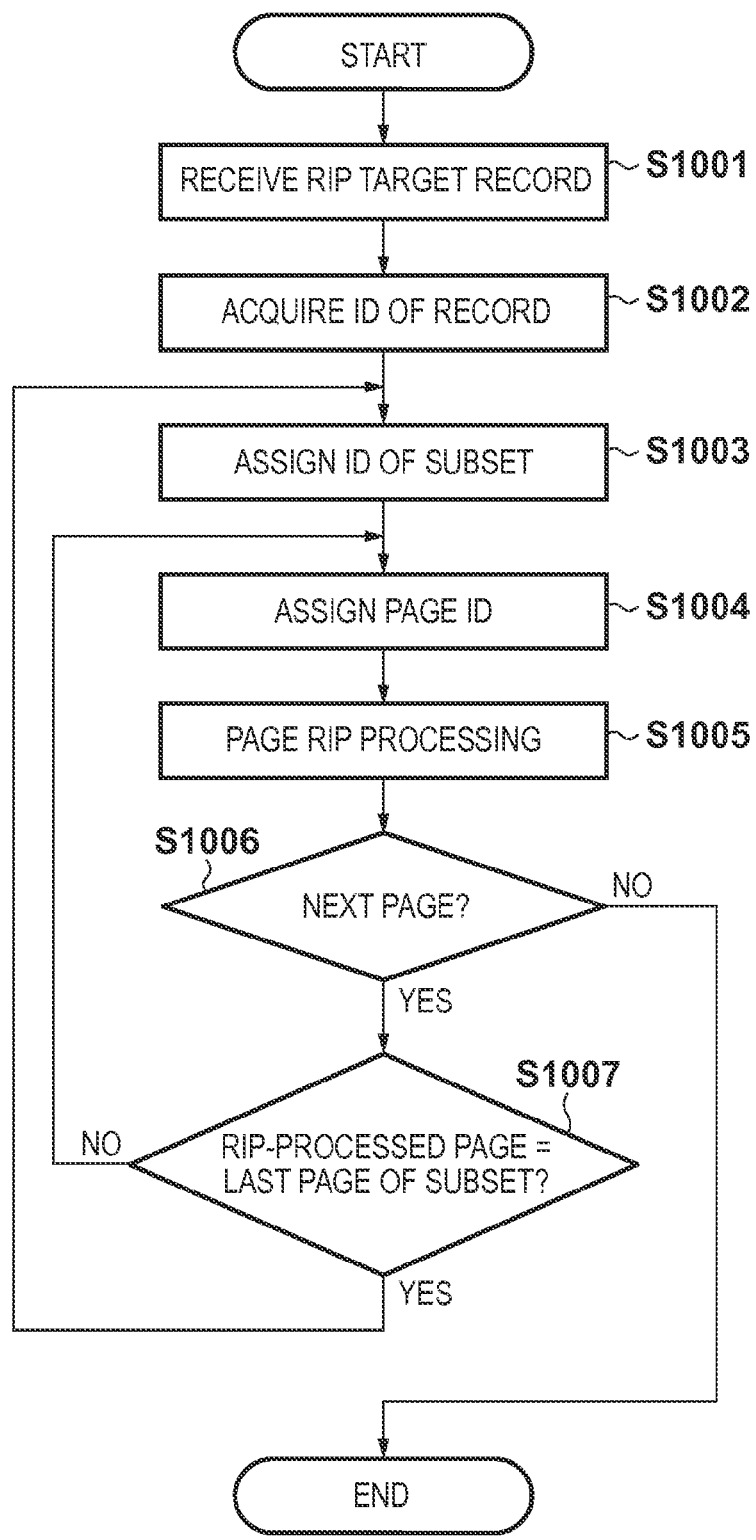
FIG. 10 is a flowchart showing the sequence of RIP processing in step S806.

FIG. 10 is a flowchart showing the detailed sequence of the RIP processing in step S806 in FIG. 8 when the RIP module 210 receives an RIP target record in step S806. The flowcharts in FIG. 10 and subsequent figures indicate a case in which it is determined in step S803 that a suspend setting instruction for each record or subset at the time of occurrence of a print error is ON. If the suspend setting for each record or subset is OFF, the processing of the overall job is interrupted. In step S1001, the RIP module 210 acquires a record as a target of the RIP processing from the analyzed record storage module 208. In step S1002, the RIP module 210 acquires the record ID from the analyzed record storage module 208. In step S1003, the RIP module 210 assigns a subset ID. This ID is that of a sub-partition. The subset ID is assigned to have a linked hierarchical structure with the record ID, so that a record (partition) can be called from a subset (sub-partition). Next, the RIP module 210 assigns a page ID to a page in step S1004. In this case as well, the page ID is assigned so that the subset including that page and the record have the hierarchical structure. In step S1005, the RIP module 210 applies the RIP processing to the page. The RIP module 210 determines in step S1006 whether or not the record includes the next page. If the record includes the next page, the process advances to step S1007. If it is determined that the record does not include the next page, the processing ends. The RIP module 210 determines in step S1007 based on print information whether or not the page that has undergone the RIP processing is a last page of the subset. If it is determined that the processed page is a last page, the process returns to step S1003 to assign a next subset ID. If all pages included in the record have undergone the RIP processing, the RIP processing sequence of the record ends.

<Suspend Processing>

Figure 11A:
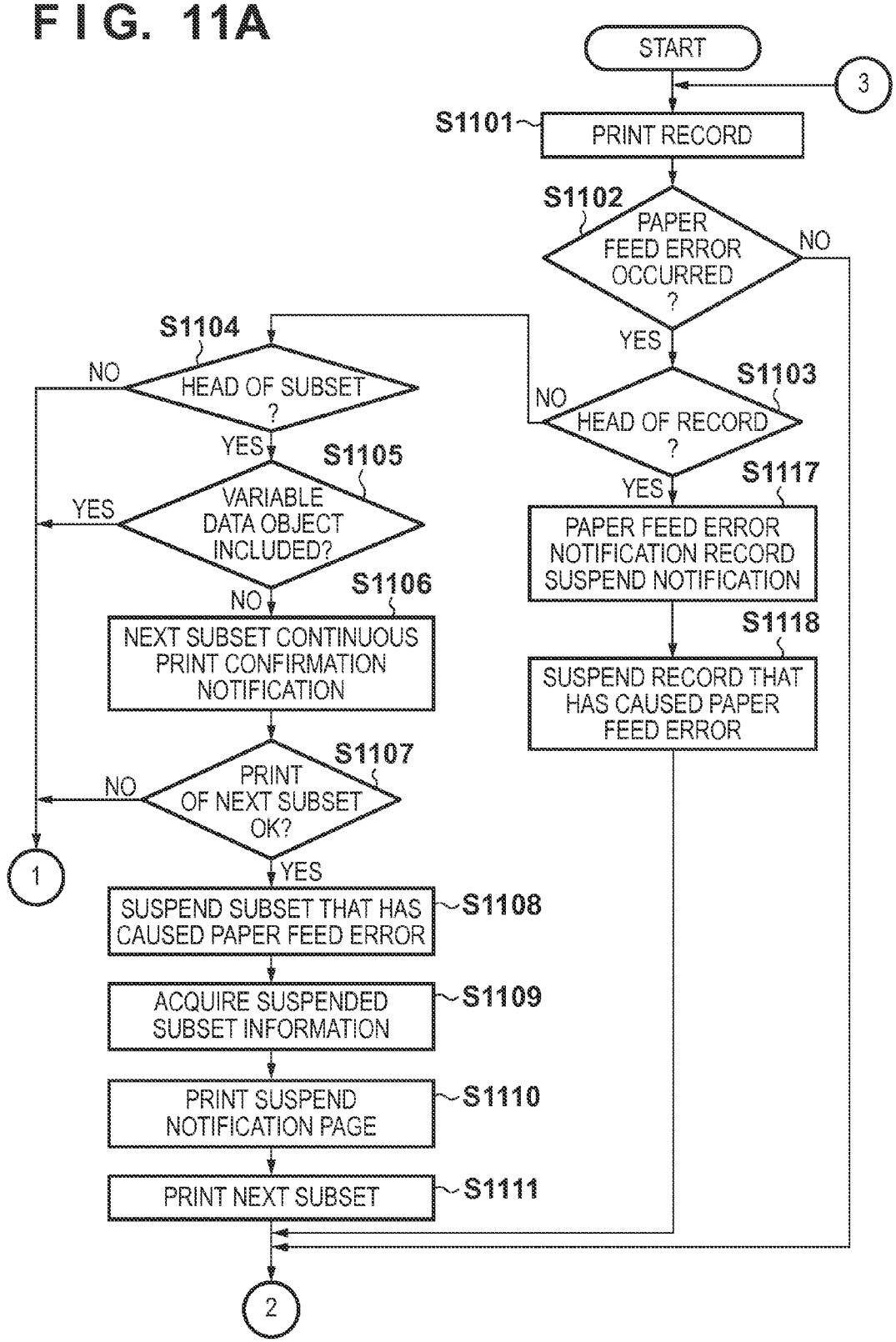
FIG. 11A and FIG. 11B are flowcharts showing the sequence of suspend processing executed when an error has occurred during print processing.
Figure 11B:
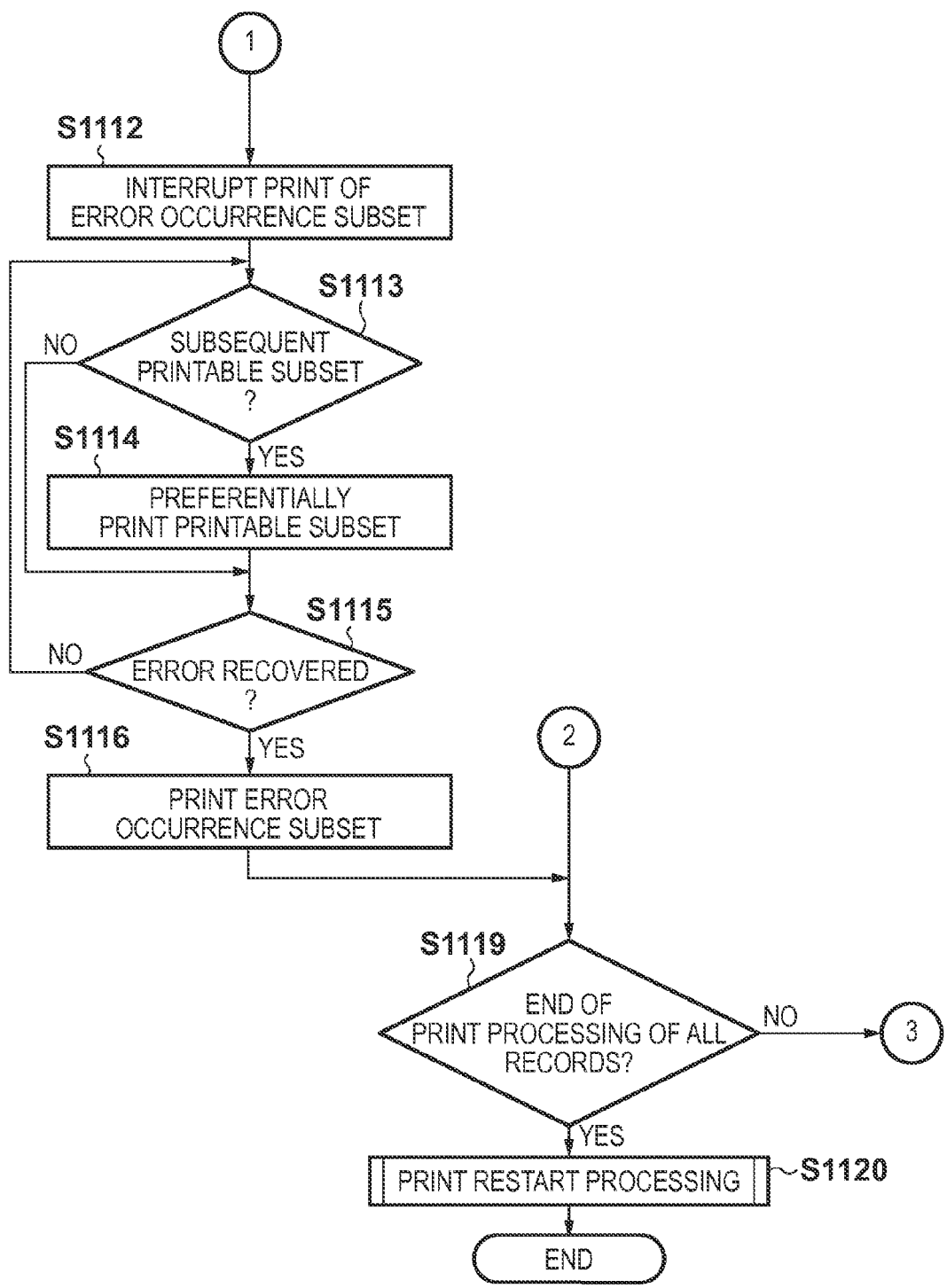

FIG. 11A and FIG. 11B are flowcharts showing the sequence of the suspend processing executed when an error has occurred during print processing. Respective processes shown in FIG. 11A, FIG. 11B and FIGS. 12 and 13 to be described later are executed by, for example, the CPU 200. In step S1101, the print control module 211 sequentially prints records. The error analysis module 209 determines in step S1102 whether nor not the print control module 211 notifies the control module 201 of the presence/absence of occurrence of a paper feed error. If it is determined that the control module 201 has been notified of the occurrence of a paper feed error, the process advances to step S1103. If it is determined that the control module 201 has not been notified of the occurrence of any error, the process jumps to step S1119. The error analysis module 209 determines in step S1103 whether or not the paper feed error has occurred at a head position of the record. If it is determined that the paper feed error has occurred at a head position of the record, the process advances to step S1117. If it is determined that the paper feed error occurrence position is not a head position of the record, the process advances to step S1104.

The error analysis module 209 determines in step S1104 whether or not the paper feed error occurrence position is a head position of a subset. If it is determined that the paper feed error has occurred at a head position of the subset, the process advances to step S1105. If it is determined that the paper feed error occurrence position is not a head position of the subset, the process advances to step S1112. The error analysis module 209 determines in step S1105 whether or not the subset which has caused the paper feed error includes a variable data object. If it is determined that the target subset includes only a master object and does not include any variable data object, the process advances to step S1106. If it is determined that the target subset includes a variable data object, the process advances to step S1112. In step S1106, the error analysis module 209 issues a next subset continuous print confirmation notification instruction to the display control module 205. The display control module 205 displays the next subset continuous print confirmation notification on the operation unit 213. The display control module 205 determines in step S1107 whether or not a next subset continuous print instruction is received from the user via the operation unit 213. If it is determined that the next subset continuous print instruction is received, the process advances to step S1108. If it is determined that no next subset print instruction is received but an interrupt instruction is received, the process advances to step S1112. In step S1108, the display control module 205 notifies the suspend control module 204 of suspension of the subset which has caused the paper feed error. The suspend control module 204 acquires the target subset from the RIP-processed data storage module 206, and sends it to the suspend storage module 203. The suspend storage module 203 stores the target subset.

In step S1109, the suspend control module 204 notifies the print control module 211 of the suspended subset information and the error occurrence contents acquired from the error analysis module 209. In step S1110, the print control module 211 prints the received subset information and error contents as a suspend occurrence notification page. At this time, the suspend occurrence notification page may be printed to be easily identified from actual output matters of the job by designating a shift output or paper type setting. In step S1111, the print control module 211 prints a subsequent subset after the paper feed error has occurred.

In step S1112, the control module 201 notifies the print control module 211 of interruption of the error occurrence subset, and the print control module 211 interrupts print processing of the error occurrence subset. The print control module 211 determines in step S1113 whether or not a subsequent printable subset is stored. If it is determined that a printable subset is stored, the process advances to step S1114. If it is determined that no subsequent printable subset is stored, the process jumps to step S1115. In this case, the printable subset is stored, for example, when a discharge stage set in the next subset is different from the error occurrence subset. When the setting of the next subset is a saddle-fold setting or C-fold setting, the discharge destination is different from the discharge stage of the finisher and is a saddle-dedicated saddle tray or folder-dedicated tray. Hence, even when the subsequent subset is printed, the order of subsets is not disturbed when it is output. Thus, the error occurrence subset is interrupted, and the subsequent subset can be output onto the saddle tray or folder tray. Therefore, since the entire print processing can be prevented from being interrupted, the print processing can be proceeded with out lowering the productivity. In step S1114, the print control module 211 preferentially prints the printable subset which is determined in step S1113. The print control module 211 determines in step S1115 whether or not the error has been recovered since it receives a paper change notification of a paper feed stage or a tray full recovery notification from the printer unit 217. If it is determined based on the received notification contents and error occurrence cause that the error has been recovered, the process advances to step S1116 to print that subset. After that, the process advances to step S1119. If it is determined that the error has not been recovered yet, the process returns to step S1113.

In step S1117, the display control module 205 instructs the operation unit 213 to display a message indicating that the paper feed has occurred, and the record which has caused the error is to be suspended. In step S1118, the suspend control module 204 sends the record which has caused the paper feed error to the suspend storage module 203, which stores the record which has caused the paper feed error as a suspend record. The print control module 211 determines in step S1119 whether or not the print processing of all records in the job is complete. If it is determined that the print processing of all records is complete, the process advances to step S1120. If it is determined that the print processing of all records is not complete yet, the process returns to step S1101. In step S1120, the suspend control module 204 executes re-print processing (to restart the print processing) of the suspended subset or record.

<Re-print Processing>

FIG. 12 is a flowchart showing the sequence of the re-print processing in step S1120. In step S1201, the suspend control module 204 detects whether or not the suspend storage module 203 stores a printable record or subset. As a result of detection, if it is determined in step S1202 that a printable record or subset is stored, the process advances to step S1203.

If it is determined that no printable record or subset is stored, this processing ends. In step S1203, the suspend control module 204 sends a print enable notification to the display control module 205. The display control module 205 receives information of the printable record and subset from the suspend control module, and issues a display instruction to the operation unit 213. The operation unit 213 displays the printable record and subset. The display control module 205 determines in step S1204 whether or not the operation unit 213 accepts a print instruction from the operator, and sends a print notification to the display control module 205. If it is determined that the operation unit 213 sends a print notification, the process advances to step S1205. If it is determined that the operation unit 213 does not send any print notification, this processing ends.

The display control module 205 determines in step S1205 whether a suspend unit corresponding to the received print instruction is a record or subset unit. As a result of determination, if it is determined that the suspend unit is a record unit, the process jumps to step S1210. As a result of determination, if it is determined that the suspend unit is a subset unit, the process advances to step S1206. The display control module 205 determines in step S1206 whether or not a re-print instruction of the suspended subset is issued in a record unit. If it is determined that a re-print instruction of the record unit is input, the process advances to step S1209. If it is determined that a re-print instruction of the subset unit is input, the process advances to step S1207. In step S1209, the suspend control module 204 acquires a record including the target subset from the suspend storage module 203. In this case, the suspend control module 204 acquires the record based on the record (partition) ID as an upper layer of the target subset (sub-partition).

In step S1210, the suspend control module 204 notifies the print control module 211 to print the record acquired in step S1209, and the print control module 211 executes print processing of that record. In step S1207, the suspend control module 204 acquires the target subset from the suspend storage module 203, and notifies the print control module 211 to execute print processing. Then, the print control module 211 executes the print processing of that subset. The suspend control module 204 determines in step S1208 whether or not the re-print instruction received from the display control module 205 includes another record or subset. If it is determined that a subset or record as a next re-print target still remains, the process returns to step S1205 to repeat the processing. If it is determined that no subset or record as a next re-print target remains, this processing ends.

Figure 13:
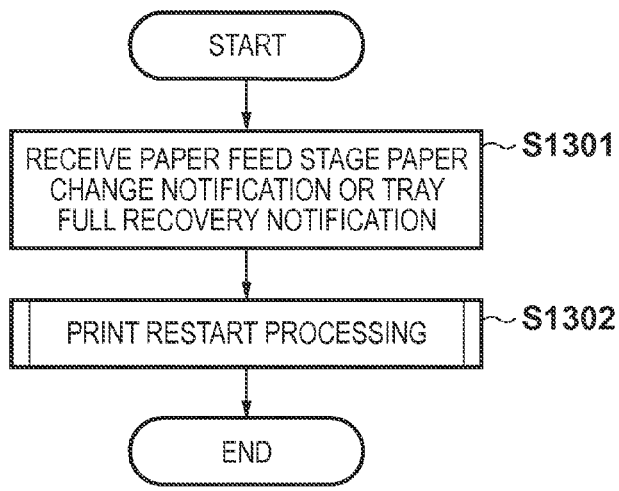
FIG. 13 is a flowchart showing the sequence of processing executed when a print error is recovered during print processing of a subsequent record.

As shown in FIG. 13, even when the print error of the suspended subset or record has been recovered during print processing of a subsequent record, the re-print processing shown in FIG. 12 may be executed. In step S1301, the print control module 211 receives a paper feed stage paper change notification or tray full recovery notification during print processing of a job. The print control module 211 notifies the control module of recovery of the error. In step S1302, the control module 201 issues, to the suspend control module 204, an instruction to detect whether or not a printable record or subset is stored in the suspend storage module 203. Then, the processing sequence shown in FIG. 12 is executed.

Figure 14:
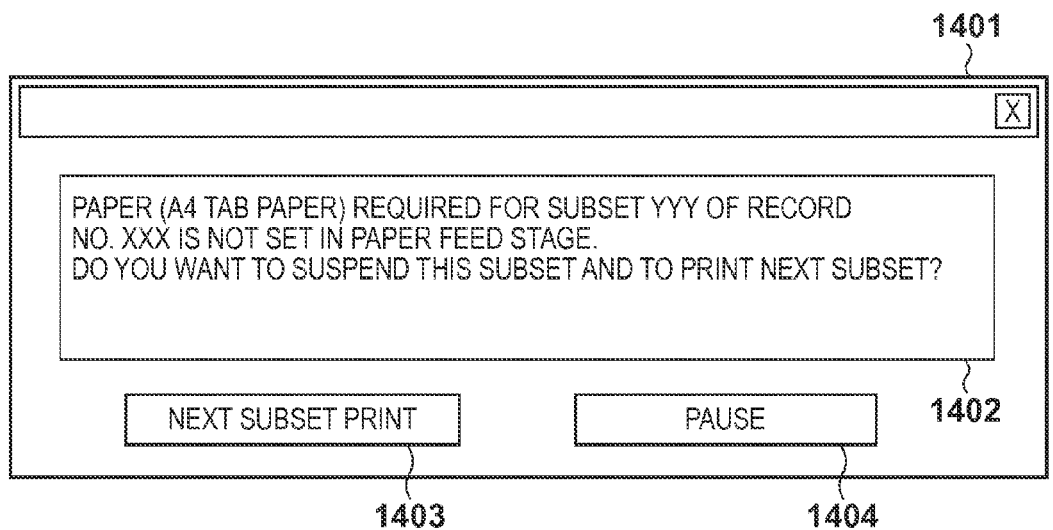
FIG. 14 is a view showing an example of a next subset continuous print confirmation notification.

FIG. 14 shows an example of a next subset continuous print confirmation notification 1401 of which the operation unit 213 notifies the operator in step S1106 (an example of first display). The next subset continuous print confirmation notification 1401 includes a print error message 1402, next subset print button 1403, and pause button 1404. The display control module 205 displays the print error message 1402 to notify that paper sheets required to print the subset are not set in the paper feed stage during print processing of the VDP job, and to ask for the operator whether or not the subset that has caused the error is suspended, and print processing of the next subset is continued. When the operation unit 213 detects pressing of the next subset print button 1403, it notifies the display control module 205 of a print instruction of the next subset. When the operation unit 213 detects pressing of the pause button 1404, it notifies the display control module 205 of a print pause instruction. Upon reception of the notification, the display control module 205 notifies the print control module 211 that print processing is interrupted. With this notification, the print processing of the error occurrence subset is interrupted without being suspended. In this way, since the operator can select whether to continue or pause print processing, an optimal operation can be selected according to a print status.

Conventionally, since the suspend processing is allowed only in a record unit, even when print processing of some subsets in the record can be continued, the record is suspended. Hence, when a paper feed error has occurred at a head position of a record, and when the same paper type setting is made in all head records, print processing of all the records is consequently interrupted. However, since the suspend processing is allowed in a subset unit, since some subsets in the record can be continuously printed, the print processing of the overall job need not be interrupted. Furthermore, when the suspend processing is allowed in only a record unit, since already printed subsets have to be re-printed, they are unwantedly printed redundantly. Also, when the record includes a large number of pages, a re-print time is prolonged. This embodiment solves such problem by allowing the suspend processing while switching a suspend unit between subset and record units.

Figure 15:
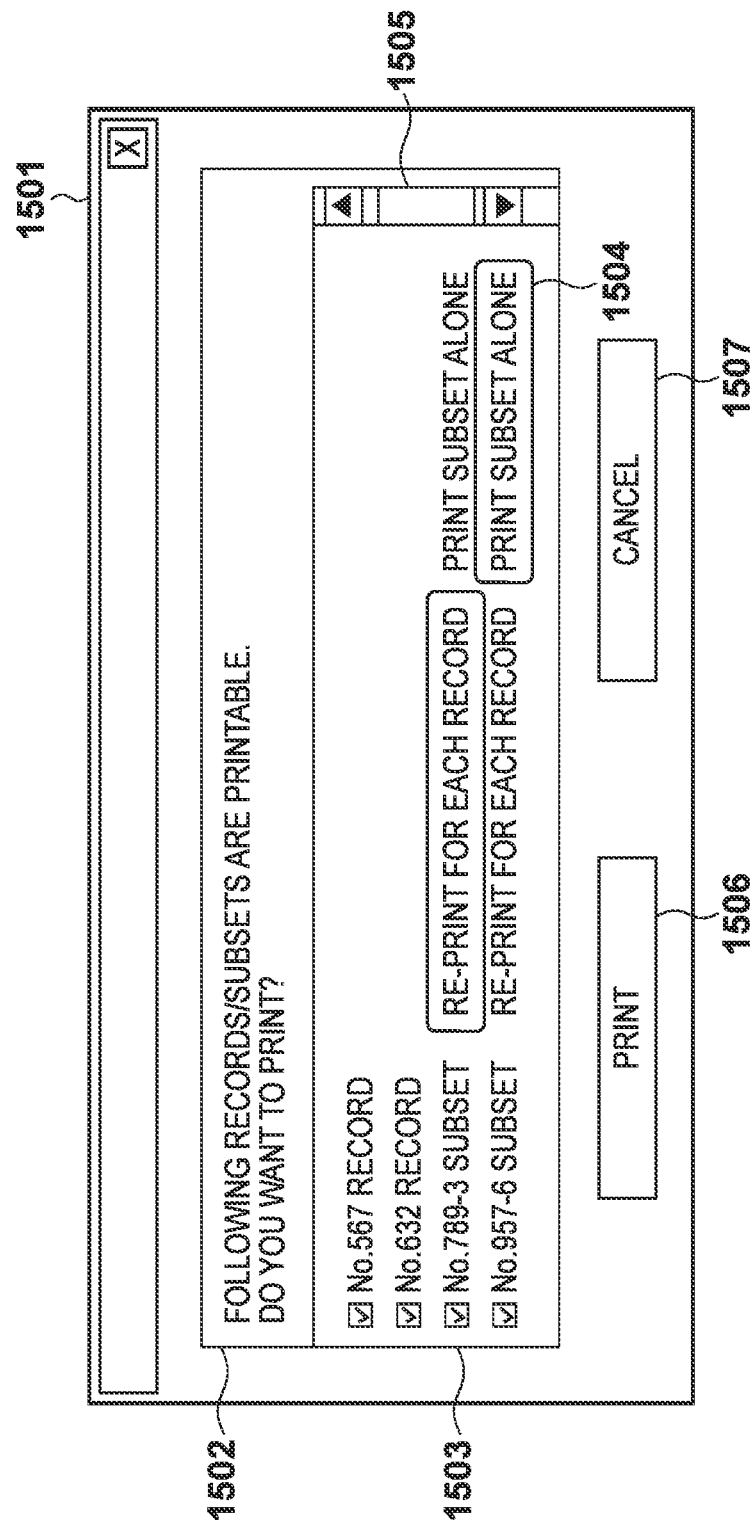
FIG. 15 is a view showing an example of a re-print enable notification to be notified to an operator.

FIG. 15 shows an example of a re-print enable notification 1501 sent when the operation unit 213 notifies the operator of a printable record and subset in step S1203 in the sequence of the re-print processing (an example of second display). The re-print enable notification 1501 includes a notification message 1502 of printable suspend data, a printable record/subset list 1503, print unit selection button 1504, scroll bar 1505, print button 1506, and cancel button 1507. The display control module 205 notifies using the notification message 1502 that printable records and subsets are stored. The printable record/subset list 1503 displays a list of records and subsets as print targets, and the operator selects records and subsets to be printed by selecting check boxes. The print unit selection button 1504 allows the user to select whether an entire record including a target subset is to be re-printed or the target subset alone is to be re-printed of the subsets selected on the printable record/subset list 1503. Using the scroll bar 1505, the user can display re-printable records or subsets. When the user presses the print button 1506, the display control module 205 is notified of a print instruction of records and subsets selected on the printable record/subset list 1503. In this case, the print instruction is notified in the unit selected by the print unit selection button 1504. When the user presses the cancel button 1507, the re-print processing is canceled. In this way, since the operator is allowed to select the re-print unit at the time of the re-print processing, missing of pages can be prevented. Since the re-print processing of each record including the suspended subset is executed as needed, the user need not search for a target record from the already printed records.

Figure 16:
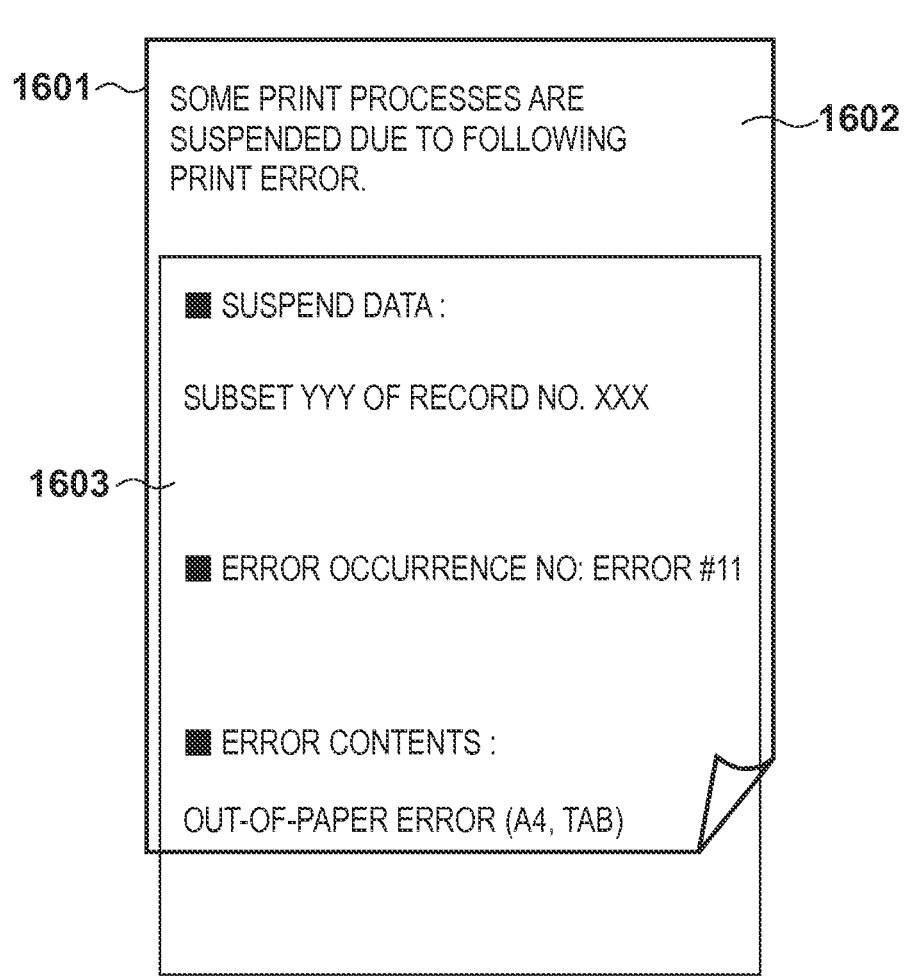
FIG. 16 is a view showing an example of a suspend notification page.

FIG. 16 shows an example of the suspend notification page output by the print control module 211 in step S1110. An output page 1601 includes an error message 1602 and error occurrence content information 1603. The error message 1602 notifies that a print error has occurred, and a subset is suspended. The error occurrence content information 1603 indicates an ID of the suspended subset, that of a record including the suspended subset, an error number, and error contents. In addition, information required for the error occurrence content information 1603 may be additionally displayed and output. Since such suspend notification page is output, the operator can detect a position where the suspension has occurred from accumulated output matters. By designating a shift output setting, rotation output setting, or paper type setting (for example, use of a color sheet) for the suspend notification page in the processing in step S1110, that page can be easily identified from output matters of the job. In this manner, an operation for inserting the suspended subset later is facilitated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-234013, filed Oct. 18, 2010 which is hereby incorporated by reference herein in its entirety.

What is claimed is:

1. An image processing apparatus, comprising:
a receiving unit configured to receive a print job including a plurality of records;
a first determining unit configured to determine whether or not an error occurs in printing of a record of the plurality of records, wherein a plurality of subsets are included in the record and each of the plurality of subsets comprises a plurality of pages;
a second determining unit configured to, in a case where it is determined by the first determining unit that the error occurs in printing of the record, determine whether or not the error occurs in printing of a first subset of the plurality of subsets;
a third determining unit configured to, in a case where it is determined by the second determining unit that the error occurs in printing of the first subset, determine whether or not a second subset of the plurality of subsets exists, wherein the second subset is able to be printed subsequent to the first subset; and
a print control unit configured to, in a case where it is determined by the third determining unit that the second subset exists, stop printing of the first subset and perform printing of the second subset,
wherein, in a case where the error occurred in printing of the first subset is recovered, the print control unit restarts printing of the first subset.

2. The apparatus according to claim 1, further comprising:
a displaying unit configured to display a selection screen for accepting a selection for performing printing in a unit of record or in a unit of subset.

3. An image processing method for an image processing apparatus, comprising:
- a receiving step of receiving a print job including a plurality of records;
- a first determining step of determining whether or not an error occurs in printing of a record of the plurality of records, wherein a plurality of subsets are included in the record and each of the plurality of subsets comprises a plurality of pages;
- a second determining step of determining, in a case where it is determined in the first determining step that the error occurs in printing of the record, whether or not the error occurs in printing of a first subset of the plurality of subsets;
- a third determining step of determining, in a case where it is determined in the second determining step that the error occurs in printing of the first subset, whether or not a second subset of the plurality of subsets exists, wherein the second subset is able to be printed subsequent to the first subset; and
- a print control step of controlling, in a case where it is determined in the third determining step that the second subset exists, stopping printing of the first subset and performing printing of the second subset,
wherein, in a case where the error occurred in printing of the first subset is recovered, the print control step restarts printing of the first subset.

4. The method according to claim 3, further comprising:
a displaying step of displaying a selection screen for accepting a selection for performing printing in a unit of record or in a unit of subset.

5. A non-transitory computer-readable storage medium on which is stored a computer-readable program that when implemented by a computer causes an information processing apparatus to perform the following:
- a receiving step of receiving a print job including a plurality of records;
- a first determining step of determining whether or not an error occurs in printing of a record of the plurality of records, wherein a plurality of subsets are included in the record and each of the plurality of subsets comprises a plurality of pages;
- a second determining step of determining, in a case where it is determined in the first determining step that the error occurs in printing of the record, whether or not the error occurs in printing of a first subset of the plurality of subsets;
- a third determining step of determining, in a case where it is determined in the second determining step that the error occurs in printing of the first subset, whether or not a second subset of the plurality of subsets exists, wherein the second subset is able to be printed subsequent to the first subset; and
- a print control step of controlling, in a case where it is determined in the third determining step that the second subset exists, stopping printing of the first subset and performing printing of the second subset,
wherein, in a case where the error occurred in printing of the first subset is recovered, the print control step restarts printing of the first subset.

6. The non-transitory computer-readable storage medium according to claim 5, further comprising:
a displaying step of displaying a selection screen for accepting a selection for performing printing in a unit of record or in a unit of subset.

* * * * *